(12) United States Patent
Sakai (10) Patent No.: US 12,131,870 B2
(45) Date of Patent: Oct. 29, 2024

(54) MULTI-LAYER CERAMIC ELECTRONIC COMPONENT, AND CIRCUIT BOARD

(71) Applicant: TAIYO YUDEN CO., LTD., Tokyo (JP)

(72) Inventor: Tomoki Sakai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/332,176

(22) Filed: Jun. 9, 2023

(65) Prior Publication Data
US 2023/0326681 A1  Oct. 12, 2023

Related U.S. Application Data

(63) Continuation of application No. 17/317,735, filed on May 11, 2021, now Pat. No. 11,715,604.

(30) Foreign Application Priority Data

May 19, 2020 (JP) ................................. 2020-087445

(51) Int. Cl.
*H01G 4/30* (2006.01)
*C04B 35/468* (2006.01)
(Continued)

(52) U.S. Cl.
CPC ............. *H01G 4/30* (2013.01); *C04B 35/468* (2013.01); *H01G 2/065* (2013.01); *H01G 4/008* (2013.01);
(Continued)

(58) Field of Classification Search
CPC .......... H01G 4/30; H01G 2/065; H01G 4/008; H01G 4/012; H01G 4/1227; H01G 4/248; H01G 4/232; C04B 35/468
(Continued)

(56) References Cited

U.S. PATENT DOCUMENTS

2002/0001712 A1  1/2002 Higuchi
2008/0118721 A1  5/2008 Horie et al.
(Continued)

FOREIGN PATENT DOCUMENTS

JP  H0422115 A  1/1992
JP  2007043144 A  2/2007
(Continued)

OTHER PUBLICATIONS

Non-Final Office Action issued by U.S. Patent and Trademark Office, dated Dec. 21, 2022, for U.S. related U.S. Appl. No. 17/317,735 (14 pages).
(Continued)

*Primary Examiner* — Arun Ramaswamy
(74) *Attorney, Agent, or Firm* — Law Office of Katsuhiro Arai (57) ABSTRACT

A multi-layer ceramic electronic component includes: a ceramic body including internal electrodes laminated and drawn to a surface of the ceramic body; and an external electrode including: a base film disposed on the surface of the ceramic body, connected to the internal electrodes, and formed from an electrically conductive material, a first nickel film disposed on and in contact with the base film in a thickness direction of the base film, and a second nickel film disposed on the first nickel film in a thickness direction of the first nickel film.

13 Claims, 6 Drawing Sheets

(51) Int. Cl.
*H01G 2/06* (2006.01)
*H01G 4/008* (2006.01)
*H01G 4/012* (2006.01)
*H01G 4/12* (2006.01)

(52) U.S. Cl.
CPC .......... *H01G 4/012* (2013.01); *H01G 4/1227* (2013.01); *C04B 2235/66* (2013.01)

(58) Field of Classification Search
USPC .......... 361/306.3, 321.1, 321.2, 321.3, 301.4
See application file for complete search history.

(56) References Cited

U.S. PATENT DOCUMENTS

| | | |
|---|---|---|
| 2009/0191418 A1 | 7/2009 | Nakano et al. |
| 2012/0288731 A1 | 11/2012 | Motoki et al. |
| 2012/0314336 A1* | 12/2012 | Ogawa ................... H01G 4/008 361/305 |
| 2016/0086733 A1* | 3/2016 | Saito ................... H01G 4/1227 205/183 |
| 2018/0197682 A1* | 7/2018 | Yamada ................. H01G 4/005 |
| 2020/0098523 A1 | 3/2020 | Shin et al. |
| 2020/0203072 A1 | 6/2020 | Park et al. |
| 2020/0203073 A1 | 6/2020 | Asano et al. |
| 2020/0203720 A1 | 6/2020 | Shiode |

FOREIGN PATENT DOCUMENTS

| | | |
|---|---|---|
| JP | 2016066783 A | 4/2016 |
| TW | 200949867 A | 12/2009 |

OTHER PUBLICATIONS

Notice of Allowance issued by U.S. Patent and Trademark Office, dated Apr. 6, 2023, for U.S. related U.S. Appl. No. 17/317,735 (9 pages).
A Notice of Reasons for Refusal issued by the Japanese Patent Office, mailed Dec. 26, 2023, for Japanese counterpart application No. 2020-087445. (5 pages).
A Decision of Refusal issued by the Japanese Patent Office, mailed Apr. 30, 2024, for Japanese counterpart application No. 2020-087445. (5 pages).
An Office Action with Search Report issued by Taiwan Intellectual Property Office on Jul. 3, 2024, for Taiwan counterpart application No. 110115882 (12 pages).

* cited by examiner

MULTI-LAYER CERAMIC ELECTRONIC COMPONENT, AND CIRCUIT BOARD

CROSS-REFERENCE TO RELATED APPLICATIONS

This application is a continuation of U.S. patent application Ser. No. 17/317,735, filed May 11, 2021, which claims priority to Japanese Patent Application No. 2020-087445, filed May 19, 2020, each disclosure of which is herein incorporated by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

BACKGROUND ART

The present disclosure relates to a method of producing a multi-layer ceramic electronic component including external electrodes, to a multi-layer ceramic electronic component, and to a circuit board using the multi-layer ceramic electronic component.

In general, the process of producing multi-layer ceramic capacitors includes a plating process for forming external electrodes. Hydrogen generated in the plating process is likely to be occluded in the external electrodes and remain there. In the multi-layer ceramic capacitors, the hydrogen in the external electrodes is diffused into a ceramic body, and thus a problem such as a decrease in insulation resistance occurs.

On the other hand, Japanese Patent Application Laid-open No. 2016-66783 discloses a method of producing a multi-layer ceramic capacitor, in which an external electrode main body containing Cu is oxidized to form a protective layer containing $Cu_2O$, an Ni plating layer is formed on the protective layer, and after the Ni plating layer is formed, heat treatment is performed at a temperature of 150° C. or higher, and an Sn plating layer is formed thereon after the heat treatment.

SUMMARY OF THE INVENTION

However, when the Ni plating layer is formed after the oxidation treatment of the external electrode main body, there is a possibility that the adhesion between the protective layer, which is as an oxide film, and the Ni plating layer is reduced. Further, the surface of the Ni plating layer subjected to the heat treatment is oxidized and may become unstable. Thus, when the Sn plating layer is formed directly on such a surface, there is a possibility that the adhesion of the Sn plating layer is reduced and the wettability of a solder to be used at the time of mounting on a board is reduced.

In view of the circumstances as described above, it is desirable to provide a method of producing a multi-layer ceramic electronic component, a multi-layer ceramic electronic component, and a circuit board using the multi-layer ceramic electronic component, which are less adversely affected by hydrogen, excellent in adhesion of plating films of an external electrode, and capable of sufficiently ensuring the bonding property of a solder at the time of mounting.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one embodiment, the present disclosure provides a method of producing a multi-layer ceramic electronic component, the method including: forming a base film formed from an electrically conductive material on a surface of a ceramic body including internal electrodes laminated and drawn to the surface in such a manner that the base film is connected to the internal electrodes; forming a first nickel film on the base film by an electrolytic plating method; performing, after forming the first nickel film, heat treatment in a weakly reducing atmosphere at a temperature equal to or higher than a temperature at which the first nickel film is recrystallized; and forming a second nickel film on the first nickel film, on which the heat treatment is performed, by an electrolytic plating method.

After the first nickel film is formed, the heat treatment is performed at a temperature at which the first nickel film is recrystallized, and thus the hydrogen taken in the first nickel film or the like is released to the outside. Further, since the first nickel film subjected to the heat treatment is recrystallized and provided with a configuration to suppress the hydrogen from diffusing, the hydrogen is prevented from entering the ceramic body after the heat treatment. This makes it possible to suppress a problem such as a decrease in insulation resistance due to the diffusion of the hydrogen into the ceramic body.

Additionally, the second nickel film is formed on the first nickel film subjected to the heat treatment, and thus the second nickel film having a less oxidized and stable surface can be disposed on the superficial side. Therefore, when the multi-layer ceramic electronic component is mounted on a board, it is possible to suppress a decrease in wettability of a solder and to sufficiently ensure the bonding property of the solder.

Moreover, the second nickel film of the same kind of material is formed on the first nickel film subjected to the heat treatment, and thus the adhesion thereof can be sufficiently ensured.

Specifically, the temperature of the heat treatment may be 450° C. or more and 800° C. or less.

This makes it possible to recrystallize the first nickel film and sufficiently release the hydrogen occluded in the first nickel film or the like, and also to obtain the first nickel film capable of sufficiently suppressing the diffusion of the hydrogen.

For example, the first nickel film may have a thickness of 1.0 μm or more and 10.0 μm or less.

This makes it possible to obtain a first nickel film capable of sufficiently suppressing the diffusion of the hydrogen after the heat treatment, and also to relax the conditions of the heat treatment for releasing the hydrogen.

For example, the second nickel film may have a thickness of 1.5 μm or more and 6.0 μm or less.

This makes it possible to sufficiently ensure the wettability of a solder at the time of mounting, and also to miniaturize the multi-layer ceramic electronic component.

For example, the base film may have a thickness of 2 μm or more and 50 μm or less.

This makes it possible to miniaturize the multi-layer ceramic electronic component while reliably covering the surface of the ceramic body with the base film.

For example, the base film may include copper or an alloy thereof as a main component.

The method of producing a multi-layer ceramic electronic component may further include forming a superficial film including tin or an alloy thereof as a main component on the second nickel film by an electrolytic plating method.

The superficial film readily reactive with a solder is formed, and thus it is possible to more reliably ensure the bonding property of the solder at the time of mounting.

In another embodiment, the present disclosure provides a multi-layer ceramic electronic component including a ceramic body and an external electrode.

The ceramic body includes internal electrodes laminated and drawn to a surface of the ceramic body.

The external electrode includes a base film, a first nickel film, and a second nickel film.

The base film is disposed on the surface of the ceramic body, connected to the internal electrodes, and formed from an electrically conductive material.

The first nickel film is disposed on the base film.

The second nickel film is disposed on the first nickel film.

For example, the first nickel film may include a recrystallized structure.

Thus, the diffusion of hydrogen is suppressed by the recrystallized structure of the first nickel film, and the entry of the hydrogen into the ceramic body is prevented.

For example, the first nickel film may have a thickness of 1.0 μm or more and 10.0 μm or less.

For example, the second nickel film may have a thickness of 1.5 μm or more and 6.0 μm or less.

For example, the base film may have a thickness of 2 μm or more and 50 μm or less.

For example, the base film may include copper or an alloy thereof as a main component.

The external electrode may further include a superficial film disposed on the second nickel film and including tin or an alloy thereof as a main component.

In still another embodiment, the present disclosure provides a circuit board including a mount board, a multi-layer ceramic electronic component, and a solder.

The multi-layer ceramic electronic component includes a ceramic body including internal electrodes laminated and drawn to a surface of the ceramic body, and an external electrode disposed on the surface of the ceramic body and connected to the internal electrodes.

The solder connects the external electrode and the mount board to each other.

The external electrode includes a base film disposed on the surface of the ceramic body and formed from an electrically conductive material, a first nickel film disposed on the base film, and a second nickel film disposed on the first nickel film.

As described above, according to the present disclosure, it is possible to provide a method of producing a multi-layer ceramic electronic component, a multi-layer ceramic electronic component, and a circuit board using the multi-layer ceramic electronic component, which are less adversely affected by hydrogen, excellent in adhesion of plating films of an external electrode, and capable of sufficiently ensuring the bonding property of a solder at the time of mounting.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-layer Ceramic Capacitor 10

Figure 1:
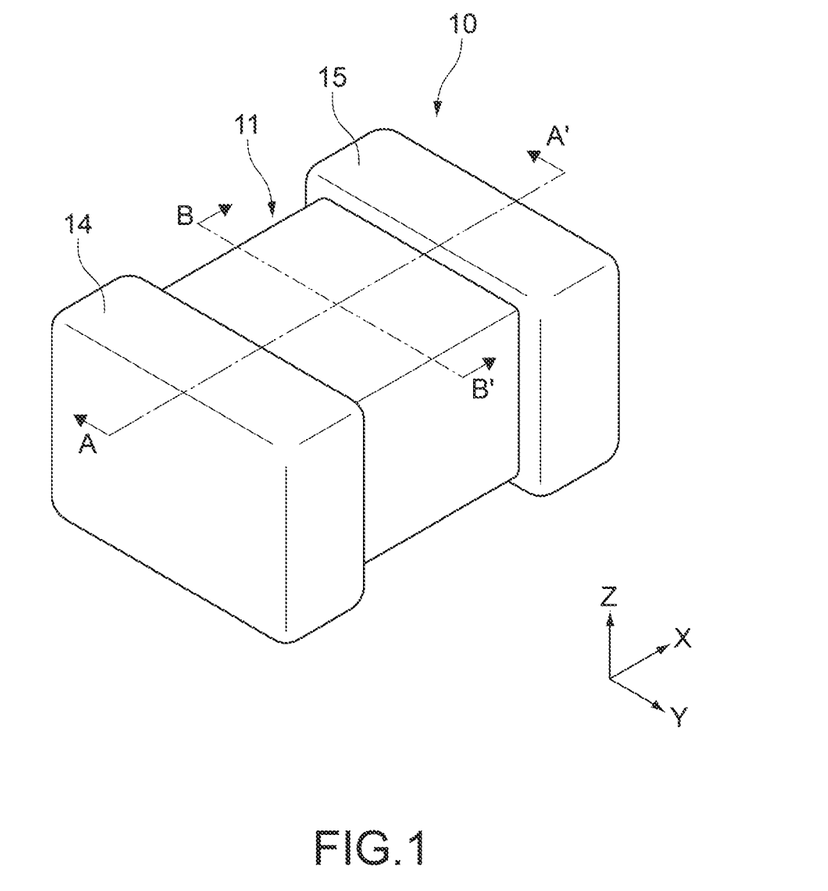
FIG. 1 is a schematic perspective view of a multi-layer ceramic electronic component according to an embodiment of the present disclosure.
Figure 2:
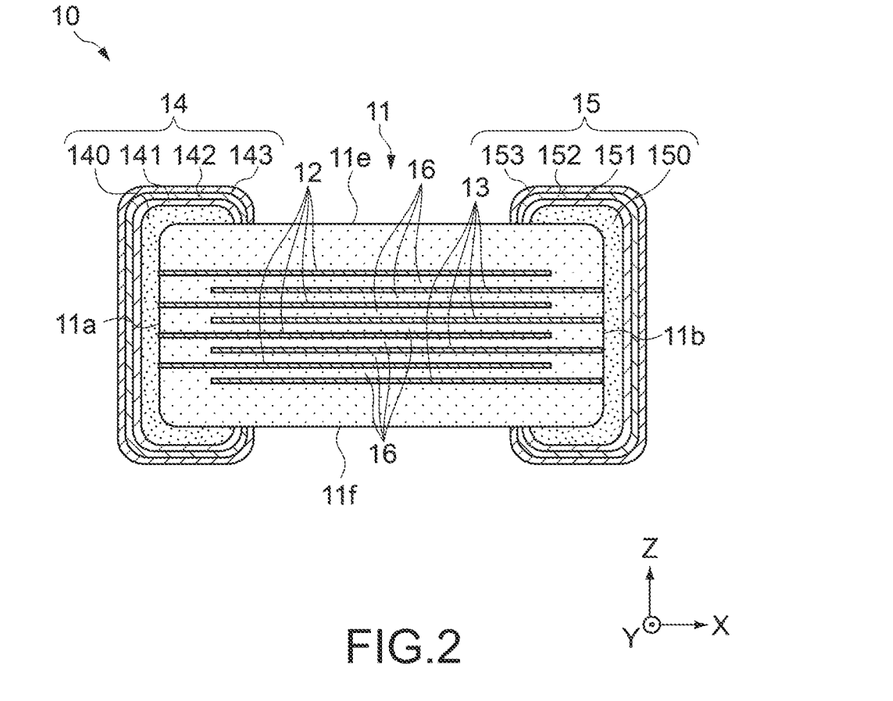
FIG. 2 is a cross-sectional view of the multi-layer ceramic electronic component taken along the A-A' line in FIG. 1.
Figure 3:
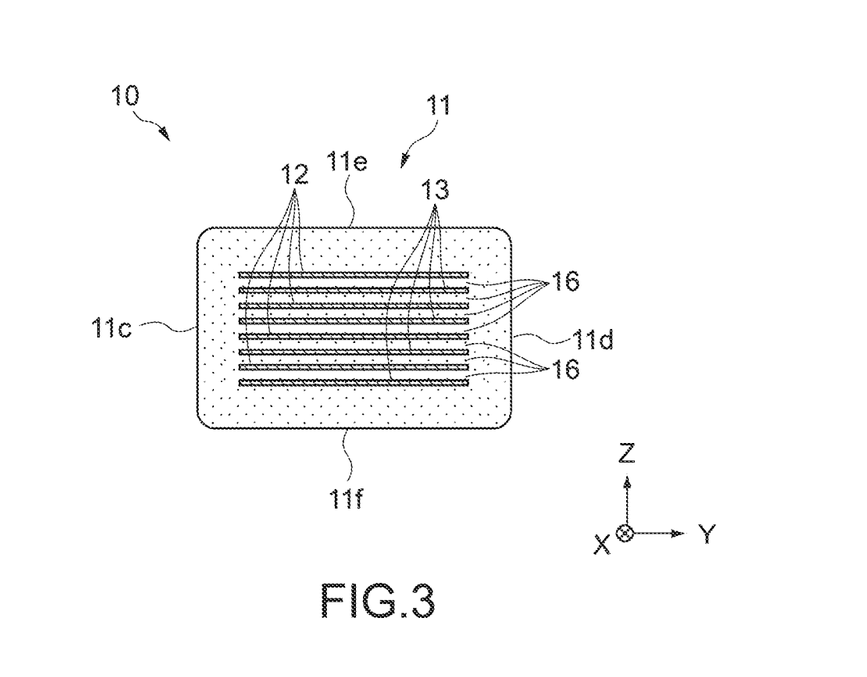
FIG. 3 is a cross-sectional view of the multi-layer ceramic electronic component taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The surface of the ceramic body 11 typically includes a first end surface 11a and a second end surface 11b that face in the X-axis direction, a first side surface 11c and a second side surface 11d that face in the Y-axis direction, and a first main surface 11e and a second main surface 11f that face in the Z-axis direction. More specifically, the first end surface 11a faces in one direction parallel to the X-axis direction, and the second end surface 11b faces in the other direction parallel to the X-axis direction. The first side surface 11c faces in one direction parallel to the Y-axis direction, and the second side surface 11d faces in the other direction parallel to the Y-axis direction. The first main surface 11e faces in one direction parallel to the Z-axis direction, and the second main surface 11f faces in the other direction parallel to the Z-axis direction. The first end surface 11a and the second end surface 11b extend along the Y-axis direction and the Z-axis direction. The first side surface 11c and the second side surface 11d extend along the Z-axis direction and the X-axis direction. The first main surface 11e and the second main surface 11f extend along the X-axis direction and the Y-axis direction.

The first end surface 11a and the second end surface 11b, the first side surface 11c and the second side surface 11d, and the first main surface 11e and the second main surface 11f of the ceramic body 11 are each formed as a flat surface. The flat surface according to this embodiment does not need to be strictly flat if the surface may be recognized as being flat when viewed as a whole. For example, the flat surface according to this embodiment also includes a surface having fine irregularities thereon, a surface having a gently curved shape, and the like.

The ceramic body 11 includes ridges interconnecting the first end surface 11a and the second end surface 11b, the first side surface 11c and the second side surface 11d, and the first main surface 11e and the second main surface 11f. The ridges are chamfered and rounded, for example, but do not have to be chamfered.

The ceramic body 11 is formed from dielectric ceramics. The ceramic body 11 includes a plurality of first internal electrodes 12 and a plurality of second internal electrodes 13 that are covered with dielectric ceramics and laminated in the Z-axis direction. The first and second internal electrodes 12 and 13 each have a sheet-like shape extending along the X-Y plane and are alternately disposed along the Z-axis direction.

In other words, the ceramic body 11 includes an opposing region where the first and second internal electrodes 12 and 13 face each other in the Z-axis direction with ceramic layers 16 being interposed therebetween. The first internal electrodes 12 are drawn from the opposing region to the first end surface 11a and connected to the first external electrode 14. The second internal electrodes 13 are drawn from the opposing region to the second end surface 11b and connected to the second external electrode 15.

With such a condiguration, when a voltage is applied between the first external electrode 14 and the second external electrode 15 in the multi-layer ceramic capacitor 10, the voltage is applied to the ceramic layers 16 in the opposing region including the first and second internal electrodes 12 and 13. This allows the multi-layer ceramic capacitor 10 to store charge corresponding to the voltage applied between the first external electrode 14 and the second external electrode 15.

In the ceramic body 11, in order to increase capacitances of the respective ceramic layers 16 provided between the first and second internal electrodes 12 and 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Note that the dielectric ceramics may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first external electrode 14 is disposed on the surface of the ceramic body 11 and covers the first end surface 11a, for example. The second external electrode 15 is disposed on the surface of the ceramic body 11 and covers the second end surface 11b, for example. The first and second external electrodes 14 and 15 face each other in the X-axis direction with the ceramic body 11 being interposed therebetween, and function as the terminals of the multi-layer ceramic capacitor 10.

The first and second external electrodes 14 and 15 extend inward in the X-axis direction from the first and second end surfaces 11a and 11b of the ceramic body 11 along the first and second main surfaces 11e and 11f and the first and second side surfaces 11c and 11d, and are spaced apart from each other on the first and second main surfaces 11e and 11f and the first and second side surfaces 11c and 11d.

Note that the form of the first and second external electrodes 14 and 15 is not limited to those shown in FIGS. 1 and 2. For example, the first and second external electrodes 14 and 15 may extend from the first and second end surfaces 11a and 11b of the ceramic body 11 to one of the main surfaces, and each may have an L-shaped cross section parallel to the X-Z plane. In addition, the first and second external electrodes 14 and 15 does not have to extend to any of the main surfaces and the side surfaces.

The first external electrode 14 has a four-layer structure including a base film 140, a first nickel film 141, a second nickel film 142, and a superficial film 143. In the first external electrode 14, the films are laminated in the order of the base film 140, the first nickel film 141, the second nickel film 142, and the superficial film 143 from the inner side to the outer side of the ceramic body 11.

The second external electrode 15 has a four-layer structure including a base film 150, a first nickel film 151, a second nickel film 152, and a superficial film 153. In the second external electrode 15, the films are laminated in the order of the base film 150, the first nickel film 151, the second nickel film 152, and the superficial film 153 from the inner side to the outer side of the ceramic body 11.

The base films 140 and 150 are formed from an electrically conductive material. For example, the base films 140 and 150 may contain Cu (copper), Ni (nickel), Ag (silver), Au (gold), Pt (platinum), Pd (palladium), Ti (titanium), Ta (tantalum), W (tungsten), or an alloy thereof as a main component. As an example, the base films 140 and 150 may contain Cu or an alloy thereof as a main component. Note that the main component refers to the component having the highest content molar ratio.

Each of the base films 140 and 150 may be configured as, for example, at least one layer of a sputtering film formed by a sputtering method, or at least one layer of a baked film obtained by baking an electrically conductive paste. Additionally, each of the base films 140 and 150 may be formed by combining a sputtering film and a baked film.

The first nickel films 141 and 151 are films formed by an electrolytic plating method and are disposed on the base films 140 and 150, respectively. The first nickel films 141 and 151 contain Ni or an alloy thereof as a main component. The first nickel films 141 and 151 are films subjected to heat treatment at a temperature equal to or higher than a temperature at which the films are recrystallized, and contain recrystallized grains of a metal or alloy containing Ni as a main component, as will be described later in detail.

The second nickel films 142 and 152 are films formed by an electrolytic plating method and are disposed on the first nickel films 141 and 151, respectively. The second nickel films 142 and 152 also contain Ni or an alloy thereof as a main component. The second nickel films 142 and 152 are formed after the heat treatment, and thus the heat treatment is not performed thereon.

The superficial films 143 and 153 are films formed by an electrolytic plating method and are disposed on the second nickel films 142 and 152. The superficial films 143 and 153 contain, for example, Sn (tin) or an alloy thereof as a main component. This configuration makes it possible to enhance the reactivity between a solder and the first and second external electrodes 14 and at the time of soldering for mounting the multi-layer ceramic capacitor 10 on a mount board, and to sufficiently bond them to each other.

2. Configuration of Circuit Board 100

Figure 4:
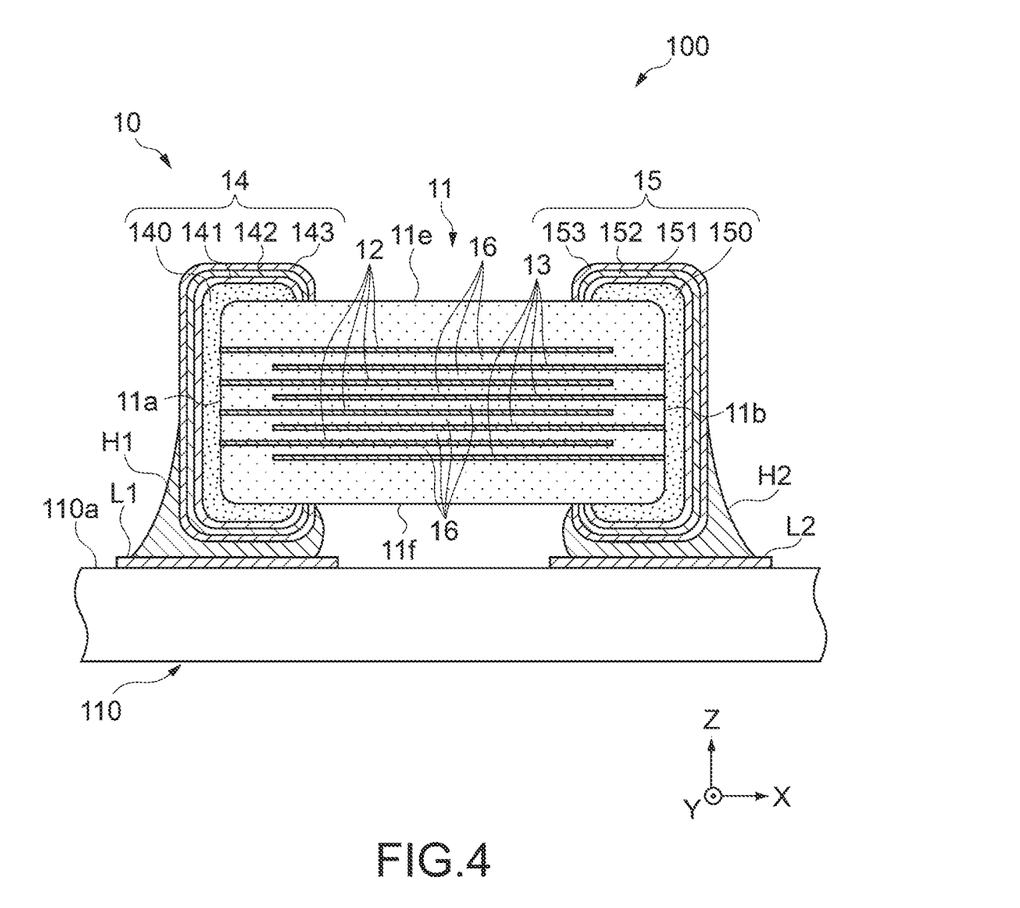
FIG. 4 is a schematic cross-sectional view of a circuit board mounting the multi-layer ceramic electronic component.

FIG. 4 is a cross-sectional view of a circuit board 100 according to this embodiment, showing the cross-section corresponding to FIG. 2.

As shown in FIG. 4, the circuit board 100 includes a mount board 110, the multi-layer ceramic capacitor 10, a first solder H1, and a second solder H2.

The mount board 110 is a board for mounting the multi-layer ceramic capacitor 10, and a circuit (not shown) may be formed thereon. The mount board 110 has a mount surface 110a facing the multi-layer ceramic capacitor 10, and includes first and second lands L1 and L2 formed on the mount surface 110a to be connected to the circuit board 100.

The first solder H1 connects the first land L1 of the mount board 110 and the first external electrode 14 to each other. The second solder H2 connects the second land L2 of the mount board 110 and the second external electrode 15 to each other. Those first and second solders H1 and H2 are formed, for example, when a solder paste applied to the first and second lands L1 and L2 is melted and spreads upward to the first and second external electrodes 14 and 15.

In the multi-layer ceramic capacitor 10, the superficial films 143 and 153 react well with the solder, which makes it possible to promote the solder to spread upward and to sufficiently bond the first and second solders H1 and H2 to the first and second external electrodes 14 and 15.

Additionally, the upward spreading of the solder is affected not only by the superficial films 143 and 153, but also by the surface condition of the lower layers thereof. In this embodiment, the second nickel films 142 and 152 that have not been subjected to the heat treatment are provided as the lower layers of the superficial films 143 and 153, and thus the wettability of the solder can be satisfactorily maintained.

Detailed operations and effects of the first nickel films 141 and 151 and the second nickel films 142 and 152 will be described later.

3. Method of Producing Multi-Layer Ceramic Capacitor 10

Figure 5:
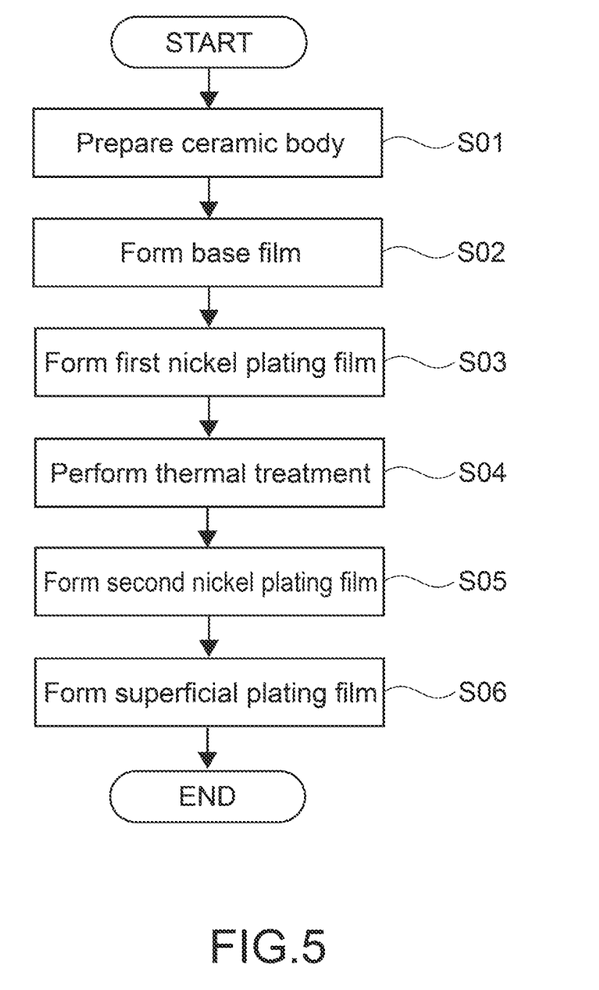
FIG. 5 is a flowchart showing a method of producing the multi-layer ceramic electronic component.
Figure 6:
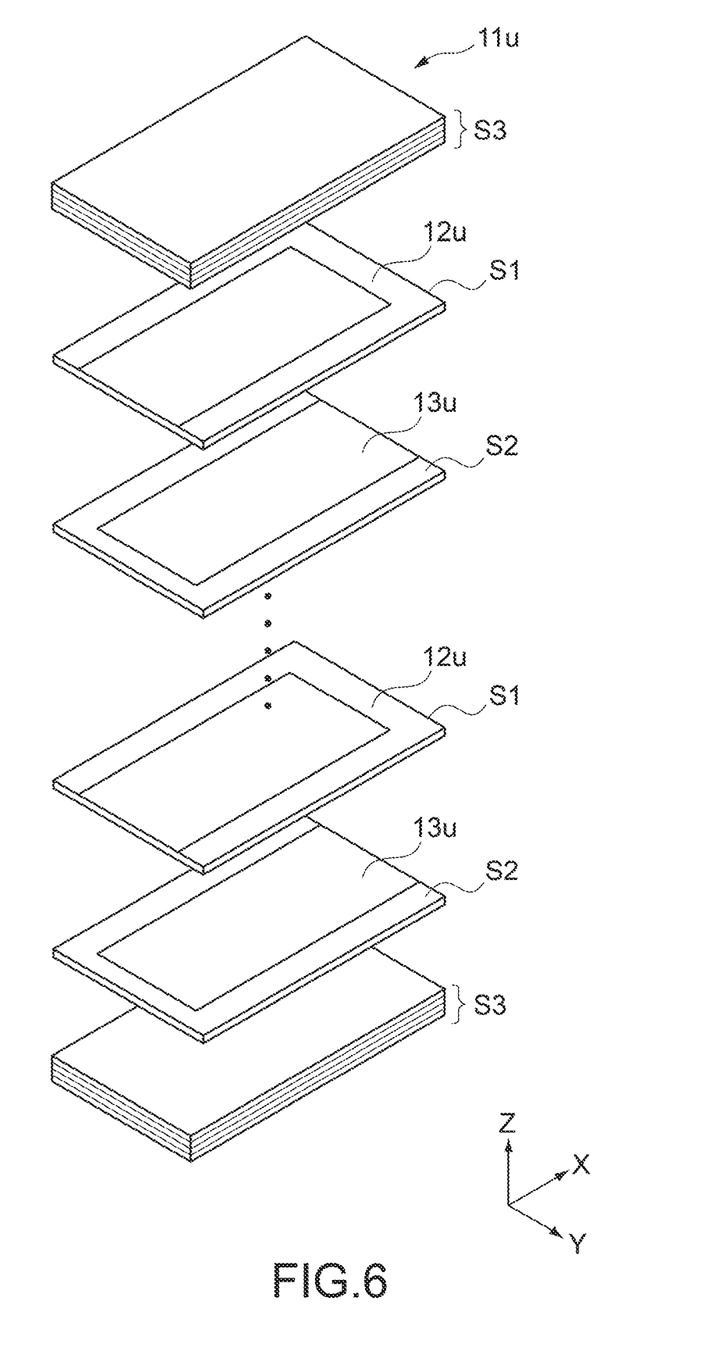
FIG. 6 is a perspective view showing a production process of the multi-layer ceramic electronic component.

FIG. 5 is a flowchart showing a method of producing the multi-layer ceramic capacitor 10. FIG. 6 is a view showing a production process of the multi-layer ceramic capacitor 10. Hereinafter, the method of producing the multi-layer ceramic capacitor 10 will be described along FIG. 5 with reference to FIG. 6 as appropriate.

3.1 Step S01: Preparation of Ceramic Body 11

In Step S01, first ceramic sheets S1, second ceramic sheets S2, and third ceramic sheets S3 are laminated as shown in FIG. 6, and then sintered to prepare the ceramic body 11.

The first, second, and third ceramic sheets S1, S2, and S3 are configured as unsintered dielectric green sheets mainly containing dielectric ceramics. Unsintered first internal electrodes 12u corresponding to the first internal electrodes 12 are formed on the first ceramic sheets S1, and unsintered second internal electrodes 13u corresponding to the second internal electrodes 13 are formed on the second ceramic sheets S2. No internal electrodes are formed on the third ceramic sheets S3.

In an unsintered ceramic body 11u shown in FIG. 6, the first and second ceramic sheets S1 and S2 are alternately laminated, and the third ceramic sheets S3 are laminated on the upper and lower surfaces of the laminate of the first and second ceramic sheets S1 and S2 in the Z-axis direction. The unsintered ceramic body 11u is integrated by pressure-bonding the first, second, and third ceramic sheets S1, S2, and S3. Note that the number of first, second, and third ceramic sheets S1, S2, and S3 is not limited to the example shown in FIG. 6.

Although the unsintered ceramic body 11u corresponding to the single ceramic body 11 has been described above, in actuality, a multi-layer sheet configured as a large-sized sheet, which is not singulated, is formed and then singulated into the ceramic bodies 11u.

The unsintered ceramic body 11u is sintered to produce the ceramic body 11 shown in FIGS. 1 to 3. The sintering temperature can be determined on the basis of the sintering temperature of the ceramic body 11u. For example, if a barium titanate based material is used as dielectric ceramics, the sintering temperature can be set to approximately 1000 to 1300° C. Additionally, sintering can be performed in a reduction atmosphere or a low-oxygen partial pressure atmosphere, for example.

3.2 Step S02: Formation of Base Films 140 and 150

In Step S02, the base films 140 and 150 formed from an electrically conductive material are formed on the surface of the ceramic body 11 so as to be connected to the first and second internal electrodes 12 and 13, respectively. In this embodiment, the base films 140 and 150 are formed to cover the first end surface 11a and the second end surface 11b, respectively.

The base films 140 and 150 are formed by, for example, applying an electrically conductive paste to the first and second end surfaces 11a and 11b of the ceramic body 11 by a dip method, a printing method, or the like, and baking the electrically conductive paste. In this case, the electrically conductive material constituting the base films 140 and 150 may include, for example, Cu, Ni, Ag, Au, Pt, Pd, or an alloy thereof as a main component.

Alternatively, the base films 140 and 150 may be formed by a sputtering method. In this case, the electrically conductive material constituting the base films 140 and 150 may include, for example, Ti, Ni, Ag, Au, Pt, Pd, Ta, W, or an alloy thereof as a main component.

The thickness of the base films 140 and 150 can be 2 μm or more and 50 μm or less. Thus, the multi-layer ceramic capacitor 10 can be reduced in size while the first and second end surfaces 11a and 11b are reliably covered with the base films 140 and 150, respectively. The thickness of the base films 140 and 150 can be, for example, the thickness of a region on the first and second end surfaces 11a and 11b, that is, a dimension, along the X-axis direction, of the central portion in the Z- and Y-axis directions.

3.3 Step S03: Formation of First Nickel Films 141 and 151

In Step S03, the first nickel films 141 and 151 are respectively formed on the base films 140 and 150. The first nickel films 141 and 151 contain Ni or an alloy thereof as a main component and are formed by an electrolytic plating method.

3.4 Step S04: Heat Treatment

In Step S04, after the first nickel films 141 and 151 are formed, heat treatment is performed thereon in a weakly reducing atmosphere. In this embodiment, the weakly reducing atmosphere means an atmosphere having an oxygen concentration of 30 ppm or less. Through the heat treatment, excessive oxidization of the first nickel films 141 and 151 is suppressed. The temperature of the heat treatment is not less than the temperature at which the first nickel films 141 and 151 are recrystallized, and specifically, can be 450° C. or more and 800° C. or less. Further, the time for performing the heat treatment can be, for example, 5 minutes or more and 30 minutes or less.

3.5 Step S05: Formation of Second Nickel Films 142 and 152

In Step S05, the second nickel films 142 and 152 are respectively formed on the first nickel films 141 and 151 subjected to the heat treatment. The second nickel films 142 and 152 contain Ni or an alloy thereof as a main component and are formed by an electrolytic plating method.

3.6 Step S06: Formation of Superficial Films 143 and 153

In S06, the superficial films 143 and 153 are respectively formed on the second nickel films 142 and 152. The superficial films 143 and 153 contain, for example, Sn or an alloy thereof as a main component and are formed by an electrolytic plating method.

The thickness of the superficial films 143 and 153 can be 3 μm or more and 10 μm or less. Thus, the multi-layer ceramic capacitor 10 can be reduced in size while sufficiently ensuring the reactivity with a solder. The thickness of the superficial films 143 and 153 can be, for example, the thickness of a region on the first and second end surfaces 11a and 11b, that is, a dimension, along the X-axis direction, of the central portion in the Z- and Y-axis directions.

The multi-layer ceramic capacitor 10 is produced as described above.

4. Detailed Description of First and Second External Electrodes 14 and 15

In the plating process of forming the first nickel films 141 and 151, the second nickel films 142 and 152, and the superficial films 143 and 153 by the electrolytic plating method, hydrogen having a strong action of deteriorating the ceramic body 11 is generated. Hydrogen generated in the plating process is likely to be occluded in the base films 140 and 150, the first nickel films 141 and 151, the second nickel films 142 and 152, and the superficial films 143 and 153 of the first and second external electrodes 14 and 15.

When the diffusion of the hydrogen occluded in the first and second external electrodes 14 and 15 into the ceramic body 11 progresses to the opposing region including the first and second internal electrodes 12 and 13, the insulation resistance of the ceramic layers 16 disposed between the first and second internal electrodes 12 and 13 decreases. Thus, an insulation failure is apt to occur in the multi-layer ceramic capacitor 10.

Note that the hydrogen occluded in the first and second external electrodes 14 and 15 is not limited to the hydrogen generated in the plating process, and may be hydrogen contained in moisture such as water vapor in the atmosphere, for example. Alternatively, the hydrogen occluded in the first and second external electrodes 14 and 15 may be in any state that hydrogen can take, such as hydrogen atoms, hydrogen ions, or hydrogen isotopes.

In this embodiment, the heat treatment of Step S04 is performed after the first nickel films 141 and 151 are formed in Step S03. Thus, the hydrogen occluded in the first nickel films 141 and 151 or the like is released to the outside and removed.

Further, the above heat treatment promotes recrystallization of the first nickel films 141 and 151, and provides the first nickel films 141 and 151 with a configuration to suppress the hydrogen from diffusing. In other words, the first nickel films 141 and 151 include a recrystallized structure. As a result, even if hydrogen is generated at the time of forming the second nickel films 142 and 152 and the superficial films 143 and 153, the first nickel films 141 and 151 suppress the hydrogen from diffusing and prevents the hydrogen from entering the ceramic body 11. Additionally, the entry of hydrogen from the outside of the multi-layer ceramic capacitor 10 is also prevented. Thus, in the multi-layer ceramic capacitor 10, the diffusion of the hydrogen into the ceramic body 11 is suppressed.

Note that the recrystallized structure of the first nickel films 141 and 151 can be determined as a crystal structure having fewer transitions and lattice defects than that of the second nickel films 142 and 152. Additionally, the recrystallized structure of the first nickel films 141 and 151 has larger crystal grains than that of the second nickel films 142 and 152. Examples of the method of observing those crystal structures include a method of chemically polishing a target surface and then observing it with an optical microscope or a scanning electron microscope (SEM) at a magnification of 500 to 5000.

For example, a method of verifying the recrystallized structure of the first nickel films 141 and 151 is as follows: first, the structure of the first nickel films 141 and 151 and the structure of the second nickel films 142 and 152 are checked; subsequently, the second nickel films 142 and 152 are subjected to heat treatment (referred to as heat treatment for verification) comparable to the heat treatment performed in Step S04; and the structure of the second nickel films 142 and 152 after subjected to the heat treatment for verification is compared with the structure of the first nickel films 141 and 151 before subjected to the heat treatment for verification. If the structure of the second nickel films 142 and 152 after subjected to the heat treatment for verification is changed to a structure similar to the structure of the first nickel films 141 and 151 before subjected to the heat treatment for verification, it can be confirmed that the first nickel films 141 and 151 have a recrystallized structure by the heat treatment performed in Step S04.

In other words, in this embodiment, the release of the hydrogen occluded in the ceramic body 11, the base films 140 and 150, and the first nickel films 141 and 151 and the formation of a diffusion suppressing layer for suppressing the diffusion of the hydrogen are performed in the same heat treatment process. Therefore, it is possible to obtain a configuration that is less susceptible to the adverse effects of the hydrogen while minimizing the thermal loads on the ceramic body 11 or the like, which are caused by the release of the hydrogen and the formation of the diffusion suppressing layer.

The thickness of the first nickel films 141 and 151 can be, for example, 1.0 μm or more and 10.0 μm or less, and more favorably 1.0 μm or more and 4.5 μm or less. The thickness of the first nickel films 141 and 151 can be, for example, the thickness of the region on the first and second end surfaces 11a and 11b, that is, a dimension, along the X-axis direction, of the central portion in the Z- and Y-axis directions.

When the thickness of the first nickel films 141 and 151 is set to 1.0 μm or more, the first nickel films 141 and 151 can sufficiently cover the base films 140 and 150, respectively, and effectively suppress the diffusion of hydrogen. Additionally, the components of the base films 140 and 150 are hardly diffused to the surfaces of the first nickel films 141 and 151, and the adhesion between those surfaces and the second nickel films 142 and 152 is enhanced. When the thickness of the first nickel films 141 and 151 is set to 10.0 μm or less, the amount of hydrogen generated by forming the first nickel films 141 and 151 can be suppressed, and the conditions of the heat treatment for releasing the hydrogen can be relaxed. Further, when the thickness of the first nickel films 141 and 151 is set to 4.5 μm or less, the thickness of the first and second external electrodes 14 and 15 can be suppressed, and the multi-layer ceramic capacitor 10 can be miniaturized.

Here, oxide films are likely to be formed on the surfaces of the first nickel films 141 and 151 subjected to the heat treatment, and the surfaces of the first nickel films 141 and 151 are unstable. If the superficial films 143 and 153 are directly formed on such first nickel films 141 and 151, there is a possibility that the wettability of a solder is reduced in the mounting process using the solder, and good bonding property by the solder is hardly obtained.

Further, if the superficial films 143 and 153 are formed on the unstable surfaces of the first nickel films 141 and 151, there is a possibility that the adhesion of the superficial films 143 and 153 is lowered, and a problem such as peeling of the superficial films 143 and 153 occurs.

In this regard, in this embodiment, the second nickel films 142 and 152 are formed on the first nickel films 141 and 151 subjected to the heat treatment. Since the second nickel films 142 and 152, which are less affected by oxidization, are disposed on the superficial side, it is possible to suppress a decrease in wettability of a solder.

Further, since metals or alloys of the same kind as those of the first nickel films 141 and 151 are used for the second nickel films 142 and 152, the adhesion between the first nickel films 141 and 151 and the second nickel films 142 and 152 can be sufficiently ensured. Further, since the superficial films 143 and 153 are formed on the second nickel films 142 and 152, which are less affected by the oxide films or the like, the adhesion between the second nickel films 142 and 152 and the superficial films 143 and 153 can also be sufficiently ensured. This makes it possible to enhance the adhesion of the plating films in each of the first and second external electrodes 14 and 15, and prevent the plating films from being peeled.

Further, the hydrogen concentration of the first nickel films 141 and 151 is reduced by the heat treatment. On the other hand, the hydrogen generated in the plating process performed after the heat treatment is occluded in the second nickel films 142 and 152. Therefore, the hydrogen concentration of the second nickel films 142 and 152 is higher than that of the first nickel films 141 and 151. Note that the hydrogen concentration can be a concentration (mol %) of hydrogen when the nickel or an alloy thereof, which is a main component of the nickel film, is assumed to be 100 mol %.

For measurement of the hydrogen concentration, for example, secondary ion mass spectrometry (SIMS) is used. As a sample for measuring the hydrogen concentration, for example, a sample obtained by cutting a multi-layer ceramic capacitor 10 parallel to the X-Z plane can be used. The cross-section of the sample is subjected to mirror polishing using, for example, a diamond paste so as to obtain sufficient smoothness for measurement.

The thickness of the second nickel films 142 and 152 can be, for example, 1.5 μm or more and 6.0 μm or less. The thickness of the second nickel films 142 and 152 can be, for example, the thickness of the region on the first and second end surfaces 11a and 11b, that is, a dimension, along the X-axis direction, of the central portion in the Z- and Y-axis directions.

When the thickness of the second nickel films 142 and 152 is set to 1.5 μm or more, the second nickel films 142 and 152 are configured to sufficiently cover the first nickel films 141 and 151 subjected to the heat treatment, respectively. This makes it possible to sufficiently ensure the wettability of the solder at the time of mounting, and also to increase the adhesion of the superficial films 143 and 153. When the thickness of the second nickel films 142 and 152 is set to 6.0 μm or less, the thickness of the first and second external electrodes 14 and 15 can be suppressed, and the multi-layer ceramic capacitor 10 can be miniaturized.

Next, the operations and effects of this embodiment will further be described with the results of the test.

5. Test Example

Figure 7:
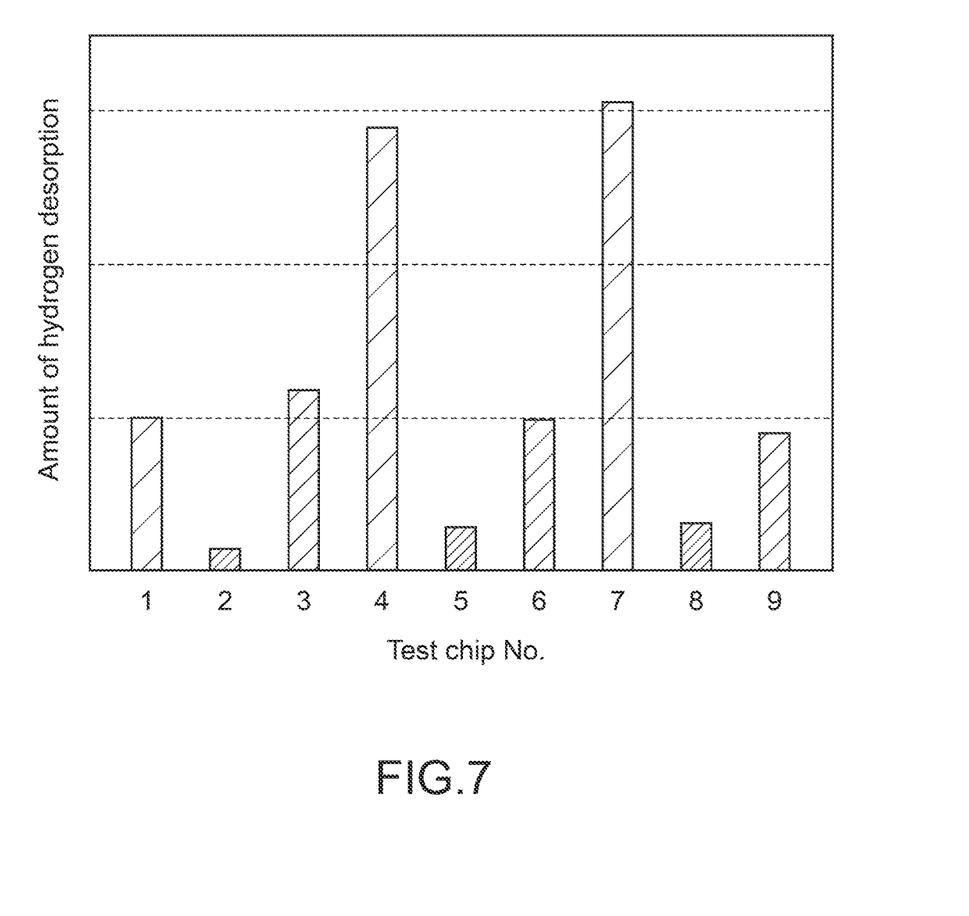
FIG. 7 is a graph showing the results of performing thermal desorption spectroscopy (TDS) on test chips including external electrodes that have different configurations and are formed on ceramic bodies of the multi-layer ceramic electronic components, in which the horizontal axis represents a test chip number, and the vertical axis represents the total amount of hydrogen desorbed from the test tips corresponding to 50 mg.

Thermal desorption spectroscopy (TDS) was performed on test chips in which external electrodes having different configurations were formed on the respective ceramic bodies 11. In the TDS, the amount of hydrogen desorbed from the test chips corresponding to 50 mg (about eight electronic components) was measured while the temperature was being raised from 100 to 1000° C.

FIG. 7 is a graph showing the results of the TDS, in which the horizontal axis represents the test chip number, and the vertical axis represents the total amount of hydrogen desorbed from the test chips corresponding to 50 mg. Specifically, the vertical axis represents the relative amount of the number of hydrogen molecules desorbed from the test chips corresponding to 50 mg, on the basis of the number of hydrogen molecules desorbed from test chips 1 corresponding to 50 mg.

Each of the test chips is obtained by forming 40-μm-thick base films containing Cu as a main component on a ceramic body, and forming predetermined plating films on the base films. For the size of the ceramic body, the dimension in the X-axis direction is approximately 1.5 mm, the dimension in the Y-axis direction is approximately 0.7 mm, and the dimension in the Z-axis direction is approximately 0.7 mm.

Each of the test chips 1 to 3 includes first nickel films having a thickness of 3 μm. The test chip 1 includes external electrodes including the base films and the first nickel films, and is not subjected to heat treatment. The test chip 2 includes external electrodes including the base films and the first nickel films, and is subjected to heat treatment at a temperature of 450 to 550° C. for 20 minutes in a weakly reducing atmosphere after the first nickel films are formed. The test chip 3 includes external electrodes including the base films, the first nickel films, and the second nickel films, and is subjected to heat treatment under the same conditions as the test chip 2 after the first nickel films are formed. The thickness of the second nickel films of the test chip 3 is 6 μm.

Each of the test chips 4 to 6 includes first nickel films having a thickness of 6 μm. The test chip 4 includes external electrodes including the base films and the first nickel films, and is not subjected to heat treatment. The test chip 5 includes external electrodes including the base films and the first nickel films, and is subjected to heat treatment under the same conditions as the test chip 2 after the first nickel films are formed. The test chip 6 includes external electrodes including the base films, the first nickel films, and the second nickel films, and is subjected to heat treatment under the same conditions as the test chip 2 after the first nickel films are formed. The thickness of the second nickel films of the test chip 6 is 6 μm.

Each of the test chips 7 to 9 includes first nickel films having a thickness of 10 μm. The test chip 7 includes external electrodes including the base films and the first nickel films, and is not subjected to heat treatment. The test chip 8 includes external electrodes including the base films and the first nickel films, and is subjected to heat treatment under the same conditions as the test chip 2 after the first nickel films are formed. The test chip 9 includes external electrodes including the base films, the first nickel films, and the second nickel films, and is subjected to heat treatment under the same conditions as the test chip 2 after the first nickel films are formed. The thickness of the second nickel films of the test chip 9 is 6 μm.

Referring to FIG. 7, comparing the results of the test chip 1 not subjected to the heat treatment and the test chip 2 subjected to the heat treatment, the amount of hydrogen desorption of the test chip 2 was greatly reduced. The same holds true for the results of the test chips 4 and 5 and for the results of the test chips 7 and 8. A small amount of hydrogen desorption in the TDS means that a small amount of hydrogen contained in the test chip. In other words, it was found from those results that the hydrogen occluded in the first nickel films or the like was released to the outside by the heat treatment.

The test chips 4 and 7 respectively including the first nickel films of 6 µm and 10 µm had a significantly higher amount of hydrogen desorption than the test chip 1 including the first nickel films of 3 µm. From this, it was found that when the first nickel film was formed to be thick, the amount of hydrogen desorption occluded in the first nickel film or the like increased.

On the other hand, in the test chips 5 and 8 respectively including the first nickel films of 6 µm and 10 µm and having been subjected to the heat treatment, the amount of hydrogen desorption was greatly reduced as compared with the test chips 4 and 7 that had not been subjected to the heat treatment. From this, it was found that even when the first nickel film was formed to have a thickness of 6 µm or 10 µm, the occluded hydrogen can be sufficiently released by the heat treatment.

The test chip 3 including the second nickel films had the amount of hydrogen desorption higher than the test chip 2 including no second nickel films. The same holds true for the results of the test chips 6 and 5 and for the results of the test chips 9 and 8. It was found from those results that when the second nickel film was formed after the heat treatment, hydrogen was occluded in the external electrodes.

Next, in order to verify whether the adverse effects of hydrogen are suppressed by the heat treatment, a highly accelerated limit test (HALT) was performed on the test chips. In HALT, ten test chips were prepared for each of the test chips 1 to 9, and a voltage of 200 V was applied thereto under the conditions of 150° C. and 400 hours to count the number of chips that caused an insulation failure.

As a result, in each of the test chips 1, 4, and 7 that have not been subjected to the heat treatment after the formation of the first nickel films, all the ten test chips had the insulation failure. On the other hand, in each of the test chips 2, 3, 5, 6, 8, and 9 that have been subjected to the heat treatment after the formation of the first nickel films, none of the test chips caused the insulation failure.

It was found from the above result that, when the heat treatment was not performed, the hydrogen occluded in the external electrode was diffused into the opposing region of the ceramic body by application of a high temperature, a high voltage, and the like, and the insulation resistance was likely to decrease. On the other hand, it was found that, when the heat treatment was performed as in the test chips 2, 3, 5, 6, 8, and 9, the decrease in insulation resistance due to hydrogen was suppressed even under severe conditions.

In particular, it was possible to suppress the insulation failure also in the test chips 3, 6, and 9 including the second nickel films formed after the heat treatment. Thus, it was found that, even when the external electrodes occluded hydrogen due to the formation of the second nickel films, the first nickel films subjected to the heat treatment were configured to suppress the hydrogen from diffusing, and the adverse effects of the hydrogen on the ceramic body were suppressed.

Further, when a tin plating film of 4 µm was formed for the ten test chips in each of the test chips 3, 6, and 9, and each pieces was soldered to a board by a reflow method, the wettability of the solder was good in each test chip, and no mounting failure occurred. Further, when the external electrodes of the test chips 3, 6, and 9 were inspected visually and with a stereomicroscope, peeling of the plating films was not found in any of the chips.

Therefore, according to this embodiment, a multi-layer ceramic capacitor is obtained, which is less susceptible to the adverse effects of hydrogen, has good adhesion of the plating films, and are capable of sufficiently ensuring the bonding property with a solder.

Note that, as can be seen from the results of the TDS in FIG. 7, it is conceivable to reduce the number of layers of the plating films from the viewpoint of reducing the amount of hydrogen generated. On the other hand, in this embodiment, the second nickel film is intentionally provided after the heat treatment is performed at a temperature at which the first nickel film is recrystallized. Thus, according to this embodiment, it is possible to solve problems of the adhesion to the superficial film and the wettability of the solder while causing the first nickel film to function as a diffusion suppressing layer for suppressing diffusion of hydrogen and suppressing the adverse effects of hydrogen.

While the embodiment of the present disclosure has been described, the present disclosure is not limited to the embodiment described above, and it should be appreciated that the present disclosure may be variously modified without departing from the gist of the present disclosure.

The configuration of the external electrode according to the present disclosure is not limited to the four-layer structure as in the embodiment described above, and the external electrode may include at least three layers of the base film, the first nickel film, and the second nickel film. For example, the external electrode according to the present disclosure may have a configuration of five or more layers.

Additionally, the present disclosure is applicable not only to the multi-layer ceramic capacitor, but also to general ceramic electronic components including external electrodes. Examples of such ceramic electronic components to which the present disclosure is applicable include a chip varistor, a chip thermistor, and a multi-layer inductor, in addition to the multi-layer ceramic capacitor.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed:

1. A multi-layer ceramic electronic component, comprising:
    a ceramic body including internal electrodes laminated and drawn to a surface of the ceramic body; and
    an external electrode including
    a base film disposed on the surface of the ceramic body, connected to the internal electrodes, and formed from an electrically conductive material,
    a first nickel film disposed on and in contact with the base film in a thickness direction of the base film, and
    a second nickel film disposed on the first nickel film in a thickness direction of the first nickel film, wherein a surface of the first nickel film is oxidized, forming an oxide film between the first nickel film and the second nickel film.

2. The multi-layer ceramic electronic component according to claim 1, wherein
the second nickel film has a higher hydrogen concentration than the first nickel film.

3. The multi-layer ceramic electronic component according to claim 1, wherein
the first nickel film includes a recrystallized structure.

4. The multi-layer ceramic electronic component according to claim 1, wherein
the second nickel film has more lattice defects than the first nickel film.

5. The multi-layer ceramic electronic component according to claim 1, wherein
the first nickel film has a thickness of 1.0 µm or more and 10.0 µm or less.

6. The multi-layer ceramic electronic component according to claim 1, wherein
the second nickel film has a thickness of 1.5 µm or more and 6.0 µm or less.

7. The multi-layer ceramic electronic component according to claim 1, wherein the base film has a thickness of 2 µm or more and 50 µm or less.

8. The multi-layer ceramic electronic component according to claim 1, wherein
the base film includes copper or an alloy thereof as a main component.

9. The multi-layer ceramic electronic component according to claim 1, wherein
the external electrode further includes
a superficial film disposed on the second nickel film and including tin or an alloy thereof as a main component.

10. The multi-layer ceramic electronic component according to claim 1, wherein a surface of the second nickel film, opposite the first nickel film, is oxidized.

11. A circuit board, comprising:
a mount board;
a multi-layer ceramic electronic component including
a ceramic body including internal electrodes laminated and drawn to a surface of the ceramic body, and
an external electrode disposed on the surface of the ceramic body and connected to the internal electrodes; and
a solder that connects the external electrode and the mount board to each other, wherein the external electrode includes
a base film disposed on the surface of the ceramic body and formed from an electrically conductive material,
a first nickel film disposed on the base film, and
a second nickel film disposed on the first nickel film,
wherein a surface of the first nickel film is oxidized, forming an oxide film between the first nickel film and the second nickel film.

12. The circuit board according to claim 11, wherein
the second nickel film has more lattice defects than the first nickel film.

13. The circuit board according to claim 11, wherein
the second nickel film has a higher hydrogen concentration than the first nickel film.

* * * * *